(12) United States Patent
Shoor et al.

(10) Patent No.: US 12,463,790 B2
(45) Date of Patent: Nov. 4, 2025

(54) SYSTEM, METHOD AND APPARATUS FOR LINK TRAINING DURING A CLOCK SWITCH EVENT

(71) Applicant: Intel Corporation, Santa Clara, CA (US)

(72) Inventors: Ehud Shoor, Haifa (IL); Tsion Vidal, Bet Rimmon (IL); Uri Hermoni, Nordia (IL); Efraim Kugman, Givat Zeev (IL); Sarel Wechsler, Sapor (IL); Oren Salomon, Nahariya (IL); Golan Cohen, Even-Yehuda (IL)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 17/677,467

(22) Filed: Feb. 22, 2022

(65) Prior Publication Data

US 2022/0182215 A1    Jun. 9, 2022

(51) Int. Cl.
*H03D 3/24* (2006.01)
*H04L 7/00* (2006.01)
*H04L 7/027* (2006.01)

(52) U.S. Cl.
CPC ............ *H04L 7/027* (2013.01); *H04L 7/0004* (2013.01)

(58) Field of Classification Search
CPC ...... H04L 7/027; H04L 7/0004; H04L 7/0087

USPC ......................... 375/375–376, 362, 373–376
See application file for complete search history.

(56) References Cited

U.S. PATENT DOCUMENTS 10,673,774 B2    6/2020   Shoor et al.
2018/0054295 A1*  2/2018   Ribo ..................... H04L 7/0087

OTHER PUBLICATIONS

Rahman Ismail, "USB4™ System Overview", USB Implementers Forum 2019, pp. 1-30.
U.S. Appl. No. 17/513,049, filed Oct. 28, 2021, entitled "System, Apparatus and Method for Communicating Debug Messages On a Sideband of a Serial Link According To a Debug Type Messaging Protocol," by Nicholas M. Kiguta.

* cited by examiner

*Primary Examiner* — Phuong Phu
(74) *Attorney, Agent, or Firm* — Schwabe, Williamson & Wyatt, P.C.

(57) ABSTRACT

In one embodiment, an apparatus comprises: a receiver to receive training data from a transmitter; a clock and data recovery (CDR) circuit coupled to the receiver, the CDR circuit to recover a recovered clock signal from the training data; and a media access control (MAC) circuit coupled to the CDR circuit, wherein the MAC circuit is to send a clock switch indicator to the CDR circuit to cause the CDR circuit to halt tracking operation of the CDR circuit. Other embodiments are described and claimed.

15 Claims, 6 Drawing Sheets

SYSTEM, METHOD AND APPARATUS FOR LINK TRAINING DURING A CLOCK SWITCH EVENT

BACKGROUND

One familiar interconnect technology is a serial link according to a given Universal Serial Bus (USB) specification. Per the recently promulgated USB4 Base Specification (Oct. 27, 2021) specification, there may be up to 6 re-timers forwarding data from one end of a link to the other end. During an initial phase of link training, these transmitters are enabled in parallel and send a training pattern. Initially, re-timer transmitters do not forward incoming data, but send a locally generated training pattern using a local clock. In later stages of link training, the re-timer transmitters sequentially switch to forward the incoming data using a recovered clock.

During this time, far-end receivers are expected to maintain their clock and data recovery (CDR) locking, which is challenging during the clock switch process, since the incoming signal might rapidly change its frequency. Moreover, with the transition to use pulse amplitude modulation (PAM)-3 in USB4 (version 2), this challenge becomes even more complex. On top of the objective challenge of tracking the rapidly changing frequency of the incoming signal, it is also very challenging to validate the CDR ability to properly address such clock switch because of the stochastic nature of the clock switch event that cannot be fully standardized.

DETAILED DESCRIPTION

In various embodiments, a receiver may be configured to control an internal clock and data recovery (CDR) circuit to halt tracking of an incoming signal in response to detection of a clock switch event. More particularly in embodiments for use in connection with training of a link such as a serial link, e.g., USB4 link, this clock switch event may occur when an upstream transmitter switches its operation from an internally generated clock (also referred to herein as a local clock) to operation according to a recovered clock, namely a clock signal recovered from an incoming data signal received in that component. In this way, constraints of the CDR circuit may be relaxed in that CDR tuning and validation complexity may be reduced, among other benefits.

Thus in various embodiments, conditions for a receiver may be eased during a clock switch event by avoiding the need to track an incoming signal during this time. In one or more implementations, an indication may be provided to receiver circuitry (and more particularly to a CDR circuit) that a clock switch event will happen soon, which enables the receiver to halt CDR tracking of the input signal and re-lock the CDR to the input signal after the transition from an upstream re-timer's local clock frequency to a recovered clock frequency has been completed.

With embodiments, more relaxed and deterministic conditions may be inherent for the CDR, reducing complexity, tuning and validation. In this way, products incorporating such interface circuitry may have faster time to market and may realize more robust operation and interoperability.

Figure 1:
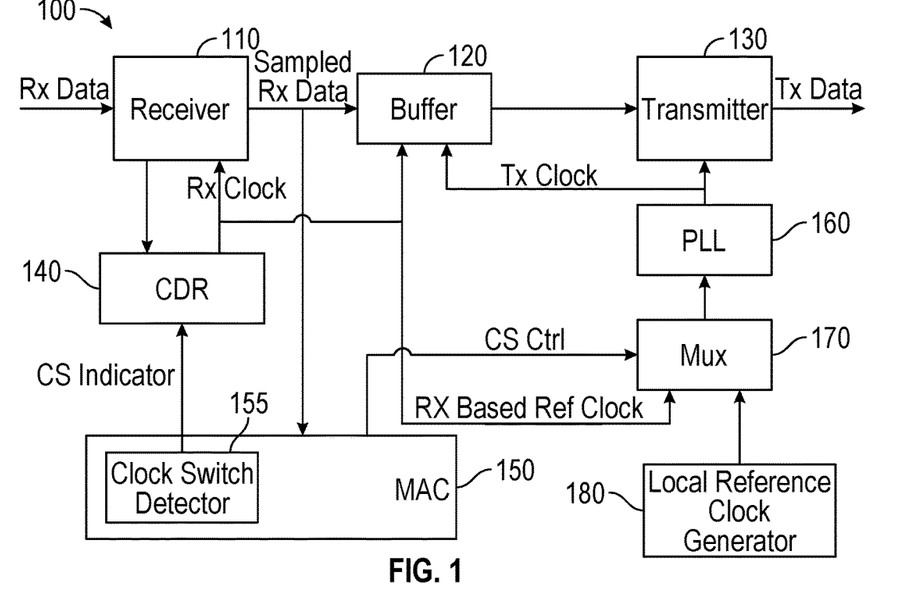
FIG. 1 is a block diagram of an apparatus in accordance with an embodiment.

Referring now to FIG. 1, shown is a block diagram of a receiver in accordance with an embodiment. As shown in FIG. 1, receiver 100 may be implemented within a variety of different components. For example, receiver 100 may be implemented within a host device, a device coupled to the host device via a link, and/or one or more re-timers located on a path between the host device and the coupled device.

As illustrated in FIG. 1, apparatus 100 may take the form of, e.g., a re-timer. As shown, apparatus 100 includes a receiver 110 that may be implemented within a physical (PHY) circuit. Receiver 110 is coupled to receive incoming data (Rx Data), which may be received from an upstream component. In turn this data, after processing in receiver 110, is provided to a buffer 120 which, in an embodiment, may be a first-in first-out (FIFO) buffer that in turn couples to a transmitter 130. Transmitter 130 transmits data (Tx Data) towards a downstream component.

Still with reference to FIG. 1, receiver 110 couples to a CDR circuit 140. In embodiments, CDR circuit 140 may recover a clock signal from the incoming data, which it provides as a recovered clock signal (Rx Clock). As shown, CDR circuit 140 provides the recovered clock to receiver 110 and buffer 120. During operation, CDR circuit 140 may implement a tracking mode of operation to track a phase and frequency of this recovered or received clock signal. CDR circuit 140 further provides recovered data to a media access control (MAC) circuit 150 which may be present within link layer circuitry.

In the embodiment shown in FIG. 1, MAC circuit 150 includes a clock switch detector 155. In embodiments herein, clock switch detector 155 may be configured to detect when a clock switch event is to occur. More specifically, clock switch detector 155 may be configured to detect, in one or more manners, when an upstream transmitter that provides the Rx Data to apparatus 100 is going to switch clocks (e.g., from a locally generated clock signal to a recovered clock signal), as may occur during a training process. This information may be provided to MAC circuit 150 from a protocol level. In one or more embodiments, MAC circuit 150 may detect the upcoming clock switch by sensing an incoming pattern that the far-end transmitter changes to a special pattern for a predetermined amount of time before actually switching its clock.

In response to detection of an upcoming clock switch event, clock switch detector 155 sends a clock switch indicator to CDR circuit 140. In response to receipt of this clock switch indicator, CDR circuit 140 may halt tracking activity before the actual clock switch occurs. This tracking halting or disabling may occur for a predetermined duration. Thereafter, CDR circuit 140 re-locks onto the incoming signal, obtaining the recovered clock, which may be at a new frequency and/or phase.

Still with reference to FIG. 1, apparatus 100 also includes a phase locked loop (PLL) circuit 160, which may generate a transmit clock signal (Tx Clock) from a given clock signal provided to it from a multiplexer 170. As seen, multiplexer 170 receives a locally generated clock signal from a local reference clock generator 180 and the received clock signal that is recovered in CDR circuit 140. The locally generated clock signal is provided to buffer 120 and transmitter 130. This locally generated clock signal may be used during training operation, before CDR circuit 140 fully locks onto the incoming signal and recovers a received clock signal. Understand while shown at this high level in the embodiment of FIG. 1, many variations and alternatives are possible.

Figure 2:
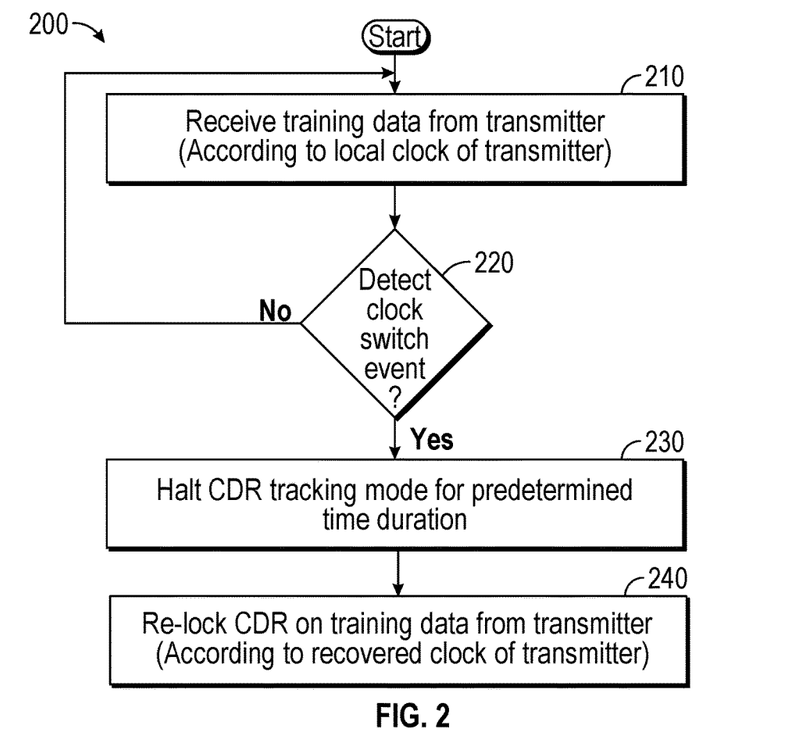
FIG. 2 is a flow diagram of a method in accordance with an embodiment.

Referring now to FIG. 2, shown is a flow diagram of a method in accordance with an embodiment. As shown in FIG. 2, method 200 is a method for controlling receiver circuitry as may be present in one or more re-timers in accordance with an embodiment. As such, method 200 may be performed by hardware circuitry present within a receiver, alone and/or in combination with firmware and/or software.

As illustrated, method 200 begins by receiving training data from a transmitter (block 210). This training data may be received during link initialization and training operations. More specifically, this training data may be a training pattern that is generated in the transmitter itself according to a local clock of the transmitter. Note that such training data may be sent during link initialization after the link has been brought up and PHY circuitry has obtained at least an appropriate level of accuracy so that link layer negotiation operations can be performed.

Control next passes to diamond 220 where it may be determined whether a clock switch event is detected. This detection may occur in link layer circuitry of the receiver. Although embodiments are not limited in this regard, there may be at least several manners of detecting this clock switch event. For example, a header of the training sequence may contain a unique marker, loss of which can be detected. Or symbol errors in a payload of the training sequence that contains a pseudo-random pattern can be triggered, and/or when a number of errors exceeds a threshold level (e.g., a given bit error rate (BER)). In another implementation, a special pattern may be detected within a MAC circuit, where this special patterns signals that a clock switch will shortly occur.

Still referring to FIG. 2, if the clock switch event is detected, next control passes to block 230 where a tracking mode of the CDR circuit of the receiver may be halted for a predetermined duration. Although embodiments are not limited in this regard, this predetermined duration may be on the order of several microseconds. In embodiments, the amount of time in which CDR tracking is halted can be aligned with clock switch specifications at the transmitter side, to ensure frequency settling and sufficiently fast recovery, such that tolerances for ensuring proper data integrity within a given time period after the clock switch are maintained. Thereafter, control passes to block 240 where the CDR circuit may be re-locked. More specifically, at this point the CDR circuit may be re-locked on training data received from the transmitter, where this training data is not locally generated in the transmitter, but is forwarded from further upstream, according to a recovered clock that the transmitter recovers. While shown at this high level in the embodiment of FIG. 2, many variations and alternatives are possible.

Figure 3:
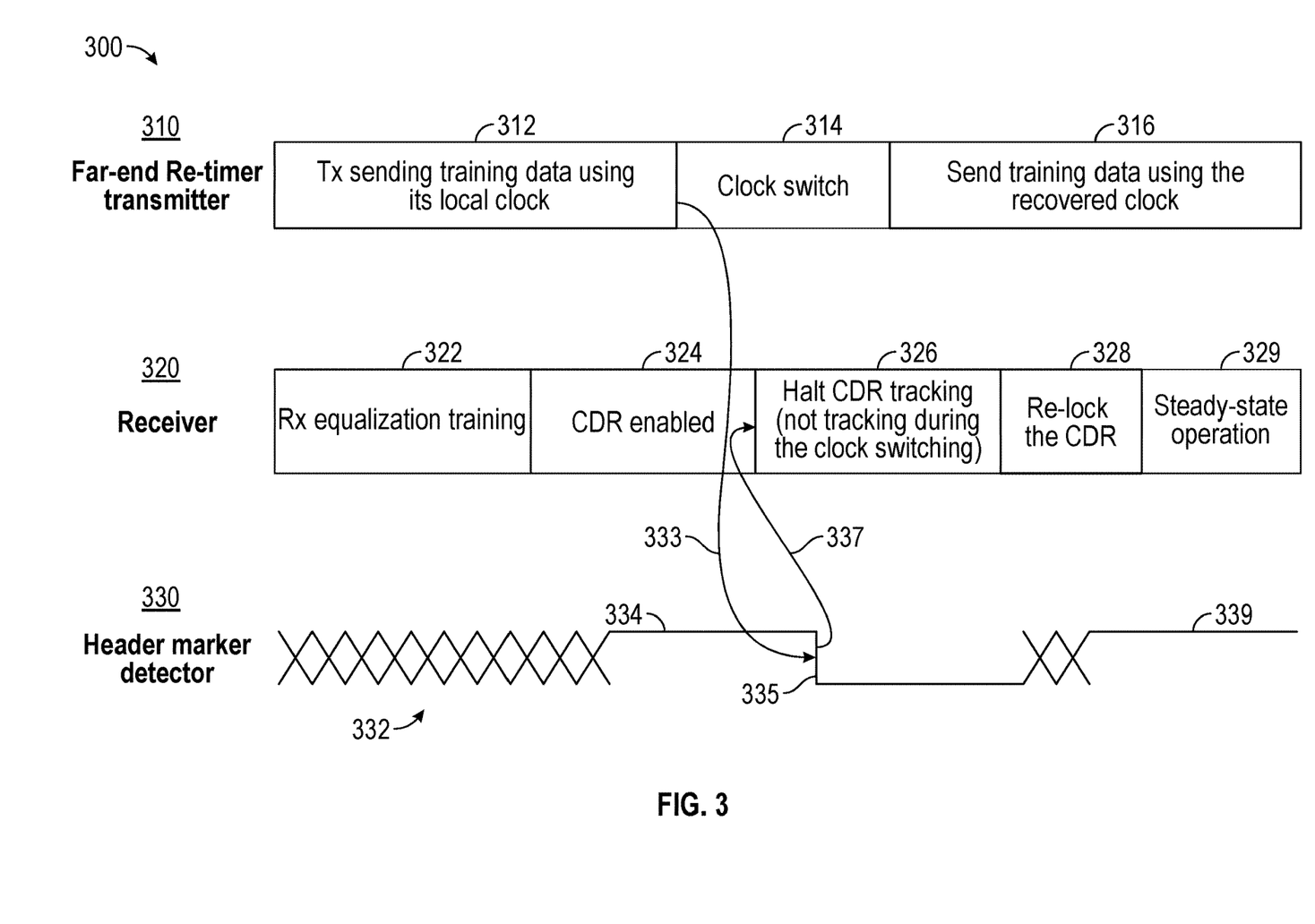
FIG. 3 is an illustration of a training sequence in accordance with an embodiment.

Referring now to FIG. 3, shown is a timing diagram illustrating operation of a training sequence in accordance with an embodiment. As shown in FIG. 3, a training sequence 300 occurs between a transmitter and a receiver. The transmitter may be a far-end re-timer and the receiver may be a receiver of, e.g., another re-timer coupled to this far-end re-timer.

As illustrated, training sequence 300 shows transmit activities 310 and receive activities 320, as well as a status 330 of received data in a link layer of the receiver. Training sequence 300 begins by the far-end transmitter sending training data using a local clock, as illustrated at time duration 312. Thereafter, at time duration 314, this far-end transmitter implements a clock switch, where it switches from sending the training data using the local clock to sending the training data using a recovered clock, which occurs at time duration 316.

As further shown in FIG. 3, with regard to receiver 320, equalization training may occur during a time duration 322, after which its CDR is enabled at time duration 324. As to activity in the link layer, during time duration 332, invalid data is received in a MAC circuit of the link layer since equalization training is occurring within the receiver. Thereafter, at time duration 334 good data is received. As shown at a time instant 335, there is a loss of data as a result of the clock switch event (as shown at arrow 333). In response to this clock switch event, the link layer circuit sends a signal to the receiver to halt CDR tracking (at arrow 337). Thus as illustrated during time duration 326, CDR tracking is halted in the receiver. This time duration 326 may be of a predetermined duration. Thereafter, the CDR re-locks to the incoming data stream at time duration 328 and thus enters steady state operation as shown at time duration 329. Note that as a result of this re-locking, good data is again received in the link layer at time duration 339. Although shown at this high level in the embodiment of FIG. 3, many variations and alternatives are possible.

In one implementation for a USB4 receiver, avoiding tracking a rapidly changing frequency of a clock signal during a far-end transmitter clock switch process may proceed as follows: the receiver is trained regularly during a time in which the far-end transmitter sends training data according to its local clock; when this initial stage of training is completed, a logical layer of the receiver starts monitoring the incoming data to detect the far-end clock switch event; upon detection of the clock switch event, the link layer provides an indication to the PHY circuit to halt CDR tracking, e.g., for a predetermined amount of time, after which the CDR may re-lock onto the incoming signal.

Figure 4:
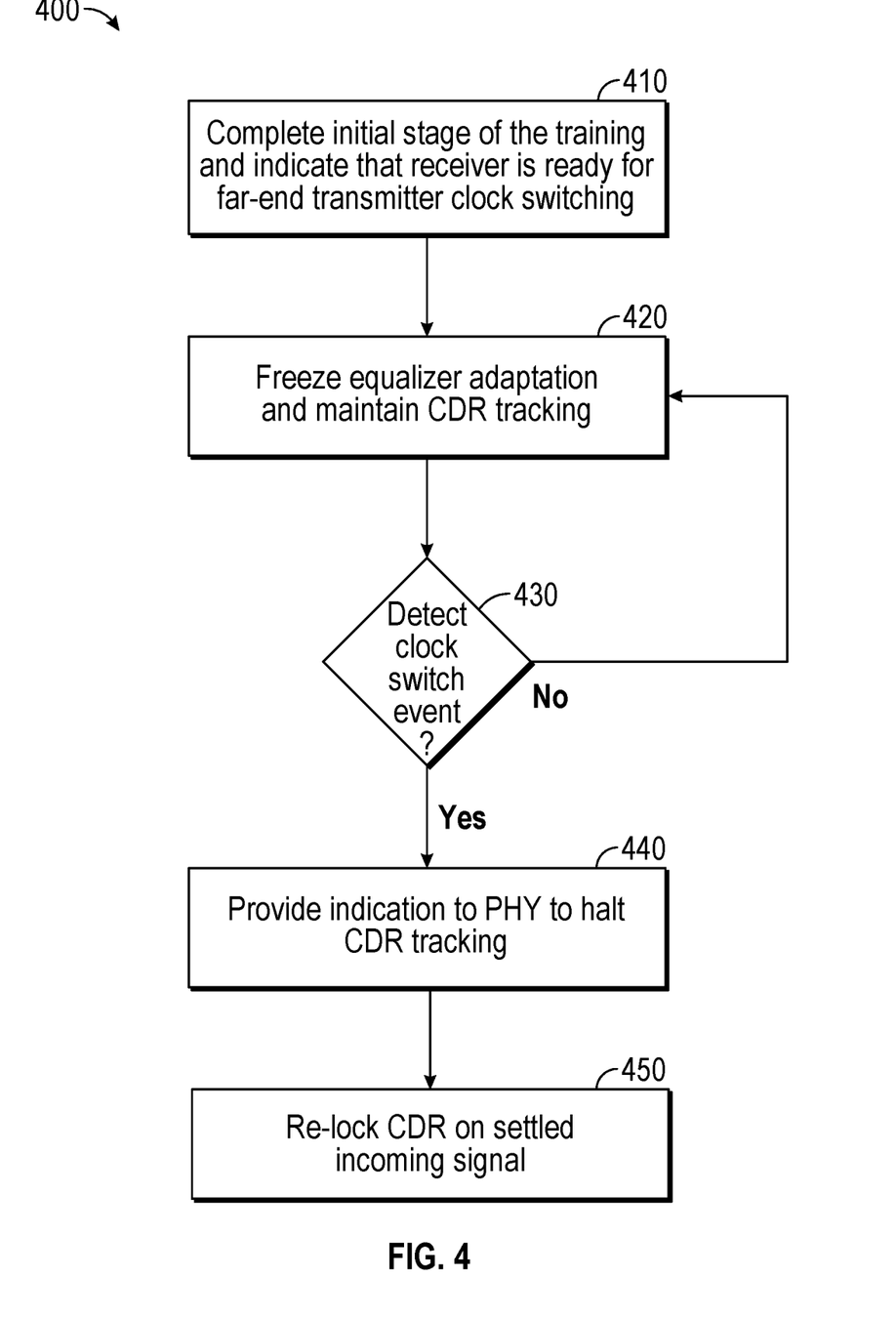
FIG. 4 is a flow diagram of a method in accordance with another embodiment.

Referring now to FIG. 4, shown is a flow diagram of a method in accordance with another embodiment. As shown in FIG. 4, method 400 is another method for controlling receiver circuitry in accordance with an embodiment. As such, method 400 may be performed by hardware circuitry present within a receiver, alone and/or in combination with firmware and/or software.

At block 410 initial stages of training of the receiver may be completed. At this point, a PHY circuit receives data that is detectable by a MAC or other link layer circuitry. Thus also at block 410, the receiver may indicate that it is ready for a clock switch event to occur in the transmitter. In an embodiment, a clock switch indication may be sent, via a sideband channel, from the receiver to the transmitter to trigger the clock switch event. Next, the receiver may freeze any equalization adaptation and maintain its CDR in a tracking mode (block 420).

Still referring to FIG. 4, it may be determined at diamond 430 whether the clock switch event has been detected. At discussed this detection may occur based on loss of a header marker, where data errors exceed a threshold level such as a given BER level, or in another manner. If so, control passes to block 440 where the link layer may send an indication to the PHY circuit to stop CDR tracking. In various implementations, this indication may be sent, e.g., via a sideband channel, a dedicated interface, or by using vendor specific fields in a PHY/MAC interface such as in accordance with a given specification such as a PHY Interface For PCIe (PIPE) communication protocol (such as in accordance with the PIPE specification version 5.0 (published November 2017).

With reference back to FIG. 1, this indication may be in the form of the clock switch indicator. In response to receipt of this indicator, the CDR may stop its tracking mode of operation for a predetermined length of time. Halting a tracking mode of CDR during an incoming frequency transition ensures that the CDR does not go out of lock. Thereafter at block 450, when this period has expired, the CDR may re-lock onto the settled incoming signal, which may be at a different frequency and/or phase. Although shown at this high level in FIG. 4, many variations and alternatives are possible.

Figure 5:
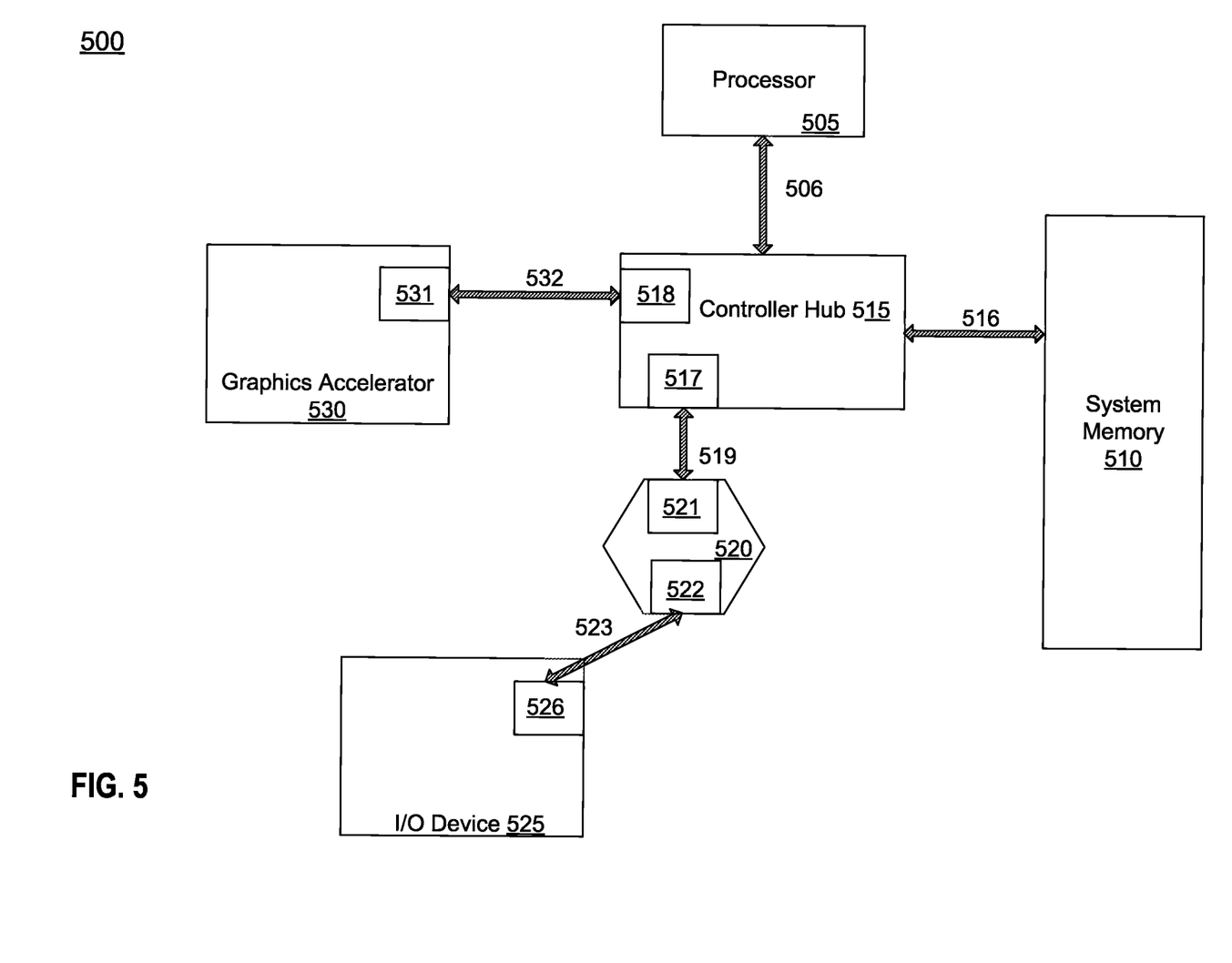
FIG. 5 is an embodiment of a fabric composed of point-to-point links that interconnect a set of components.

Embodiments may be implemented in a wide variety of systems. Referring to FIG. 5, an embodiment of a fabric composed of point-to-point links that interconnect a set of components is illustrated. System 500 includes processor 505 and system memory 510 coupled to controller hub 515. Processor 505 includes any processing element, such as a microprocessor, a host processor, an embedded processor, a co-processor, or other processor. Processor 505 is coupled to controller hub 515 through a link 506, such as an Intel® UPI serial point-to-point interconnect.

System memory 510 includes any memory device, such as random access memory (RAM), non-volatile (NV) memory, or other memory accessible by devices in system 500. System memory 510 is coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in a PCIe interconnection hierarchy. Examples of controller hub 515 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 505.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520. Switch/bridge 520 couples to a device 525 through an interconnect 523 (e.g., a USB4 link) via corresponding interfaces/ports 522 and 526, and along with these coupled devices, may halt CDR tracking during clock switch events, as described herein.

Switch/bridge 520 routes packets/messages from device 525 upstream, i.e., up a hierarchy towards a root complex, to controller hub 515 and downstream, i.e., down a hierarchy away from a root controller, from processor 505 or system memory 510 to device 525. Device 525 may be any peripheral including any internal or external device or component to be coupled to an electronic system e.g., via a USB4 or other serial interface. Device 525 may be an I/O device, a NIC, an add-in card, an audio processor, a network processor, a memory expander, a hard-drive, a storage device such as a solid state drive, a CD/DVD ROM, a monitor, a printer, a mouse, a keyboard, a router, a portable storage device, a Firewire device, a USB device, a scanner, and other input/output devices.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. A graphics controller or the graphics accelerator 530 itself may be integrated in processor 505.

Figure 6:
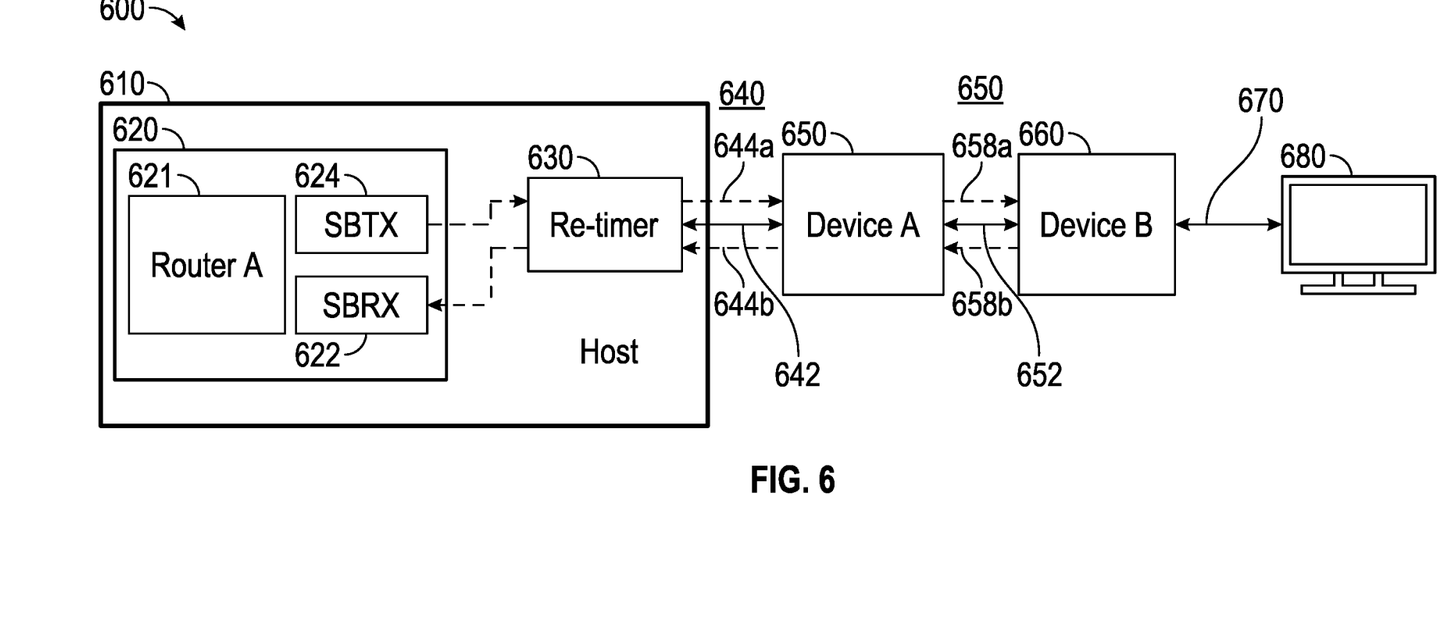
FIG. 6 is a block diagram of a computing environment in accordance with another embodiment.

Referring now to FIG. 6, shown is block diagram of a computing environment in accordance with another embodiment. As shown in FIG. 6, computing environment 600 includes a host system 610. In various embodiments, host system 610 may be a personal computer such as a desktop computer, portable computer, tablet computer or so forth. Of course in other implementations the host system may be another type of computing platform, including but not limited to server systems, embedded systems or so forth. As shown, host system 610 couples to a device 650 (Device A) via a link 640. As one example, device 650 may be implemented as a docking station or other device in communication with host system 610. In the embodiment of FIG. 6, link 640 may be implemented as a serial link, e.g., a USB4 link having a main link 642 and a sideband link 644a,b, namely a corresponding transmit and receive pair.

While many components of host system 610 are not illustrated, including a host processor such as a central processing unit (CPU) or other system-on-chip (SoC), memory, storage such as a non-volatile memory and so forth, an interface circuit 620 is illustrated. As shown, interface circuit 620 may be a serial bus interface that includes a router 621 and corresponding sideband receive and transmit circuits (respectively 622, 624). In turn, interface circuit 620 couples to a re-timer 630 that in turn communicates with device 650 via serial link 640. In the illustration of FIG. 6, sideband link 644 provides sideband point-to-point connectivity between two agents, and is depicted with dashed arrows. Link 642 may be implemented as a USB4 or Thunderbolt High Speed IO link.

As further shown in FIG. 6, an additional agent or device 660 (Device B) couples to device 650 via another serial link 655 including a main link 656 and sideband link 658a,b. A display 680 couples to device 660 via yet another link 670. In this arrangement, during a training process the various devices (which may include one or more re-timers) may undergo clock switching as described herein. When these events are detected by partner devices, the receiving partner devices may cause CDR tracking halting, in accordance with one or more embodiments.

Figure 7:
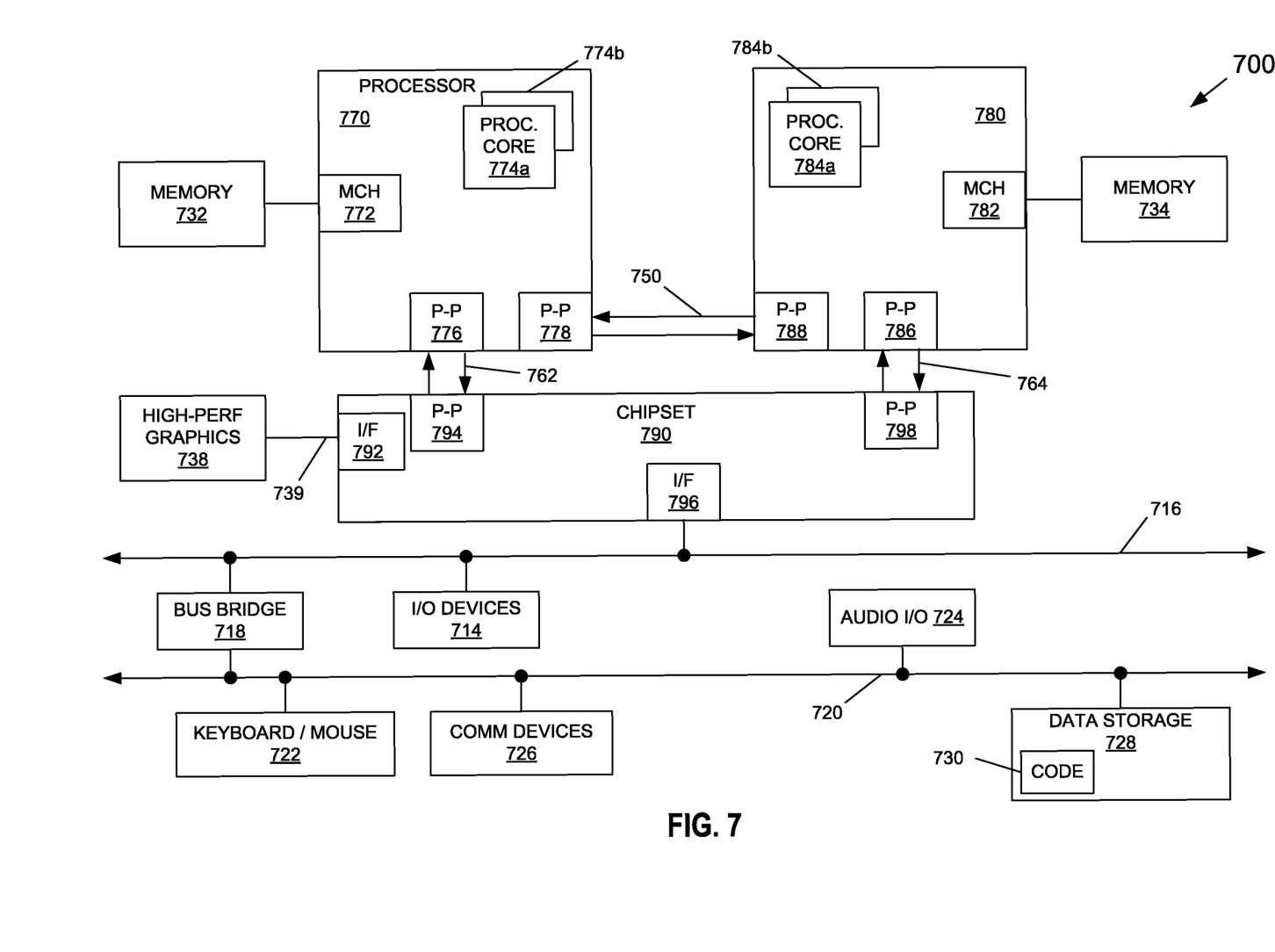
FIG. 7 is a block diagram of a system in accordance with an embodiment of the present invention

Referring now to FIG. 7, shown is a block diagram of a system in accordance with an embodiment. As shown in FIG. 7, multiprocessor system 700 includes a first processor 770 and a second processor 780 coupled via a point-to-point interconnect 750. As shown in FIG. 7, each of processors 770 and 780 may be many core processors including representative first and second processor cores (i.e., processor cores 774a and 774b and processor cores 784a and 784b).

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to a first bus 716, along with a bus bridge 718 which couples first bus 716 to a second bus 720. One or more of I/O devices 714 may couple to system 700 via a USB4 interface, where the coupled devices can, during a training phase, halt CDR tracking during clock switch events as described herein.

Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720.

The following examples pertain to further embodiments.

In one example, an apparatus comprises: a receiver to receive training data from a transmitter; CDR circuit coupled to the receiver to recover a recovered clock signal from the training data; and a MAC circuit coupled to the CDR circuit. The MAC circuit may be configured to send a clock switch indicator to the CDR circuit to cause the CDR circuit to halt tracking operation of the CDR circuit.

In an example, the MAC circuit comprises a clock switch detector to detect a clock switch event in the transmitter, the MAC circuit to send the clock switch indicator in response to the detection of the clock switch event.

In an example, the clock switch detector is to detect the clock switch event based at least in part on a loss of the training data.

In an example, the clock switch detector is to detect the clock switch event based at least in part on a marker included in the training data.

In an example, in response to the clock switch indicator, the CDR circuit is to halt the tracking operation for a predetermined time duration.

In an example, after the predetermined time duration, the CDR circuit is to re-lock onto the training data.

In an example, the apparatus comprises a re-timer.

In an example, the re-timer comprises: a PHY circuit comprising the receiver and the CDR circuit; and a link layer circuit coupled to the PHY circuit, the link layer circuit comprising the MAC circuit.

In an example, the re-timer is to send a clock switch request to the transmitter when the MAC circuit detects the training data.

In another example, a method comprises: receiving, in a receiver circuit, training data from a transmitter; detecting that a clock switch event has occurred in the transmitter; and in response to detecting that the clock switch event has occurred, halting a tracking mode of a CDR circuit.

In an example, the method further comprises re-initiating the tracking mode of the CDR circuit after a predetermined time duration.

In an example, the method further comprises receiving the training data from the transmitter, the training data generated in the transmitter according to a local clock signal, the transmitter comprising a first re-timer, the first re-timer coupled to a second re-timer, the second re-timer comprising the receiver circuit.

In an example, the method further comprises: re-initiating the tracking mode of the CDR circuit after a predetermined time duration; and thereafter receiving, in the receiver circuit, the training data from the transmitter, the training data forwarded from the transmitter according to a recovered clock signal.

In an example, the method further comprises detecting the clock switch event when an error rate of the training data exceeds a threshold.

In an example, the method further comprises detecting the clock switch event based on an indicator present in a header of the training data.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises: a host device; a device coupled to the host device via a link; and at least one re-timer coupled between the host device and the device. The at least one re-timer comprises: a receiver to receive training data from a transmitter; a CDR circuit coupled to the receiver to recover a recovered clock signal from the training data; and a MAC circuit coupled to the CDR circuit, where the MAC circuit is to send a clock switch indicator to the CDR circuit to cause the CDR circuit to halt tracking operation of the CDR circuit during a clock switch event in the transmitter.

In an example, the MAC circuit comprises a clock switch detector to detect the clock switch event based at least in part on a loss of the training data.

In an example, in response to the clock switch indicator, the CDR circuit is to halt the tracking operation for a predetermined time duration.

In an example, after the predetermined time duration, the CDR circuit is to re-lock onto the training data.

In an example, the re-timer comprises a PHY-MAC interface via which the clock switch indicator is sent.

In another example, an apparatus comprises: receiver means for receiving training data from a transmitter; CDR means coupled to the receiver means for recovering a recovered clock signal from the training data; and MAC means coupled to the CDR means. The MAC means may be configured to send a clock switch indicator to the CDR means for causing the CDR means to halt tracking operation of the CDR means.

In an example, the MAC means comprises clock switch detector means for detecting a clock switch event in the transmitter, the MAC means for sending the clock switch indicator in response to the detection of the clock switch event.

In an example, the clock switch detector means is to detect the clock switch event based at least in part on a loss of the training data.

In an example, the clock switch detector means is to detect the clock switch event based at least in part on a marker included in the training data.

In an example, in response to the clock switch indicator, the CDR means is to halt the tracking operation for a predetermined time duration, and after the predetermined time duration, the CDR means is to re-lock onto the training data.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising: a receiver to receive training data from a transmitter;
a clock and data recovery (CDR) circuit coupled to the receiver, the CDR circuit to recover a recovered clock signal from the training data; and
a media access control (MAC) circuit coupled to the CDR circuit, wherein the MAC circuit is to send a clock switch indicator to the CDR circuit to cause the CDR circuit to halt tracking operation of the CDR circuit; wherein:
the apparatus comprises a re-timer;
the re-timer comprises:
a physical (PHY) circuit comprising the receiver and the CDR circuit; and
a link layer circuit coupled to the PHY circuit, the link layer circuit comprising the MAC circuit; and
the re-timer is to send a clock switch request to the transmitter when the MAC circuit detects the training data.

2. The apparatus of claim 1, wherein the MAC circuit comprises a clock switch detector to detect a clock switch event in the transmitter, the MAC circuit to send the clock switch indicator in response to the detection of the clock switch event.

3. The apparatus of claim 2, wherein the clock switch detector is to detect the clock switch event based at least in part on a loss of the training data.

4. The apparatus of claim 2, wherein the clock switch detector is to detect the clock switch event based at least in part on a marker included in the training data.

5. The apparatus of claim 1, wherein in response to the clock switch indicator, the CDR circuit is to halt the tracking operation for a predetermined time duration.

6. The apparatus of claim 5, wherein, after the predetermined time duration, the CDR circuit is to re-lock onto the training data.

7. A method comprising:
receiving, in a receiver circuit, training data from a transmitter;
detecting that a clock switch event has occurred in the transmitter;
in response to detecting that the clock switch event has occurred, halting a tracking mode of a clock and data recovery (CDR) circuit; and
receiving the training data from the transmitter, the training data generated in the transmitter according to a local clock signal, the transmitter comprising a first re-timer, the first re-timer coupled to a second re-timer, and the second re-timer comprising the receiver circuit.

8. The method of claim 7, further comprising re-initiating the tracking mode of the CDR circuit after a predetermined time duration.

9. The method of claim 7, further comprising:
re-initiating the tracking mode of the CDR circuit after a predetermined time duration; and thereafter receiving, in the receiver circuit, the training data from the transmitter, the training data forwarded from the transmitter according to a recovered clock signal.

10. The method of claim 7, further comprising detecting the clock switch event when an error rate of the training data exceeds a threshold.

11. The method of claim 7, further comprising detecting the clock switch event based on an indicator present in a header of the training data.

12. A system comprising:
a host device;
a device coupled to the host device via a link; and
at least one re-timer coupled between the host device and the device, wherein the at least one re-timer comprises:
a receiver to receive training data from a transmitter;
a clock and data recovery (CDR) circuit coupled to the receiver, the CDR circuit to recover a recovered clock signal from the training data; and
a media access control (MAC) circuit coupled to the CDR circuit, wherein the MAC circuit is to send a clock switch indicator to the CDR circuit to cause the CDR circuit to halt tracking operation of the CDR circuit during a clock switch event in the transmitter, and the MAC circuit comprises a clock switch detector to detect the clock switch event based at least in part on a loss of the training data.

13. The system of claim 12, wherein in response to the clock switch indicator, the CDR circuit is to halt the tracking operation for a predetermined time duration.

14. The system of claim 13, wherein, after the predetermined time duration, the CDR circuit is to re-lock onto the training data.

15. The system of claim 12, wherein the re-timer comprises a physical (PHY)-MAC interface via which the clock switch indicator is sent.

* * * * *